(12) United States Patent
Hiruta et al.

(10) Patent No.: US 10,953,849 B2
(45) Date of Patent: Mar. 23, 2021

(54) SEATBELT DEVICE FOR VEHICLE

(71) Applicant: MAZDA MOTOR CORPORATION, Hiroshima (JP)

(72) Inventors: Teruhiko Hiruta, Hiroshima (JP); Yoichi Miyajima, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 89 days.

(21) Appl. No.: 16/273,770

(22) Filed: Feb. 12, 2019

(65) Prior Publication Data
US 2019/0291688 A1 Sep. 26, 2019

(30) Foreign Application Priority Data
Mar. 22, 2018 (JP) .............................. JP2018-055061

(51) Int. Cl.
| | | |
|---|---|---|
| *B60R 22/46* | (2006.01) | |
| *B60R 22/40* | (2006.01) | |
| *B60R 22/28* | (2006.01) | |
| *B60R 22/34* | (2006.01) | |

(52) U.S. Cl.
CPC .......... *B60R 22/4633* (2013.01); *B60R 22/28* (2013.01); *B60R 22/341* (2013.01); *B60R 22/40* (2013.01); *B60R 22/4604* (2013.01); *B60R 2022/285* (2013.01); *B60R 2022/288* (2013.01); *B60R 2022/289* (2013.01); *B60R 2022/4685* (2013.01)

(58) Field of Classification Search
CPC ... B60R 22/4633; B60R 22/28; B60R 22/341; B60R 22/40; B60R 22/4604; B60R 2022/285; B60R 2022/289; B60R 2022/288; B60R 2022/4685; B60R 22/36; B60R 22/46
See application file for complete search history.

(56) References Cited

U.S. PATENT DOCUMENTS

| | | | | |
|---|---|---|---|---|
| 4,023,427 A | * | 5/1977 | Beier | ................... B60R 22/1955 |
| | | | | 297/480 |
| 4,032,174 A | * | 6/1977 | Andres | ............... B60R 22/1951 |
| | | | | 297/480 |
| 4,108,471 A | * | 8/1978 | Kondo | ................ B60R 22/3408 |
| | | | | 280/807 |

(Continued)

FOREIGN PATENT DOCUMENTS

| | | |
|---|---|---|
| EP | 0 563 728 A1 | 10/1993 |
| JP | 2015-054647 A | 3/2015 |

(Continued)

OTHER PUBLICATIONS

The extended European search report issued by the European Patent Office dated Jun. 17, 2019, which corresponds to European Patent Application No. 19160165.7 and is related to U.S. Appl. No. 16/273,770.

*Primary Examiner* — Paul N Dickson
*Assistant Examiner* — Timothy Wilhelm
(74) *Attorney, Agent, or Firm* — Studebaker & Brackett PC

(57) ABSTRACT

A seatbelt device for a vehicle comprises a belt which restrains an occupant, a retractor which supports the belt so as to wind up one end of the belt, a frictional-force applier which is configured to apply a frictional force to the belt by contacting the belt, and an actuator to actuate the frictional-force applier so as to change the frictional force.

15 Claims, 14 Drawing Sheets

(56) References Cited

U.S. PATENT DOCUMENTS

| | | | | |
|---|---|---|---|---|
| 4,306,735 A * | 12/1981 | Pfeiffer | B60R 22/1855 | 280/733 |
| 4,310,176 A * | 1/1982 | Furusawa | B60R 22/42 | 242/381.4 |
| 4,323,204 A * | 4/1982 | Takada | B60R 22/42 | 242/378.4 |
| 4,327,881 A * | 5/1982 | Fohl | B60R 22/1855 | 242/381.4 |
| 4,351,545 A * | 9/1982 | Cardew | B60R 22/1855 | 188/65.1 |
| 4,485,985 A * | 12/1984 | Fohl | B60R 22/42 | 242/381.4 |
| 4,491,343 A * | 1/1985 | Fohl | B60R 22/1855 | 280/801.1 |
| 4,494,774 A * | 1/1985 | Fohl | B60R 22/42 | 242/381.4 |
| 4,550,951 A * | 11/1985 | Apri | B60R 22/1855 | 280/806 |
| 4,552,407 A * | 11/1985 | Takada | B60R 22/1855 | 24/579.11 |
| 4,597,586 A * | 7/1986 | Burghardt | B60R 22/1951 | 280/806 |
| 4,614,007 A * | 9/1986 | Else | B60R 22/1855 | 24/134 L |
| 4,647,071 A * | 3/1987 | Tabata | B60R 22/1951 | 242/381.4 |
| 4,772,046 A * | 9/1988 | Salomonsson | B60R 22/1951 | 242/399 |
| 4,838,388 A * | 6/1989 | Cunningham | B60R 22/1855 | 188/65.1 |
| 4,993,746 A * | 2/1991 | Hagelthorn | B60R 22/1855 | 242/377 |
| 5,004,178 A * | 4/1991 | Kobayashi | B60R 21/01 | 242/374 |
| 5,316,339 A * | 5/1994 | Lorenz | B60R 22/1855 | 280/806 |
| 5,346,152 A * | 9/1994 | Fohl | B60R 22/1951 | 242/371 |
| 5,544,917 A * | 8/1996 | Loxton | B60R 22/26 | 280/801.2 |
| 5,765,869 A * | 6/1998 | Huber | B60R 21/18 | 280/733 |
| 5,975,566 A * | 11/1999 | Bocker | B60R 21/213 | 280/730.2 |
| 6,109,697 A * | 8/2000 | Lane, Jr. | B60R 22/195 | 297/464 |
| 6,145,881 A * | 11/2000 | Miller, III | B60R 22/1951 | 280/801.2 |
| 6,527,298 B2 * | 3/2003 | Kopetzky | B60R 22/1958 | 280/806 |
| 6,565,121 B2 * | 5/2003 | Knych | B60R 22/1951 | 280/806 |
| 6,793,249 B2 * | 9/2004 | Lobert | B60R 22/19 | 280/806 |
| 7,350,734 B2 * | 4/2008 | Stevens | B60R 22/1955 | 242/374 |
| 7,350,862 B2 * | 4/2008 | Fransen | B60N 2/2812 | 297/250.1 |
| 7,866,703 B2 * | 1/2011 | Spahn | B60R 22/195 | 280/806 |
| 8,469,400 B2 * | 6/2013 | Merrill | B60N 2/4242 | 280/801.1 |
| 9,038,935 B2 * | 5/2015 | Stroik, Jr. | B60R 22/341 | 242/397.1 |
| 9,248,797 B2 * | 2/2016 | Odate | H02P 6/007 | |
| 9,821,757 B2 * | 11/2017 | Moeker | A44B 11/2553 | |
| 9,821,760 B2 * | 11/2017 | Sun | B60R 22/42 | |
| 2006/0022078 A1 * | 2/2006 | Kitazawa | B60R 22/3413 | 242/382 |
| 2017/0291572 A1 * | 10/2017 | Burczyk | B60R 22/195 | |

FOREIGN PATENT DOCUMENTS

| | | |
|---|---|---|
| JP | 2015-128925 A | 7/2015 |
| WO | 03/076238 A1 | 9/2003 |
| WO | 2006/044541 A2 | 4/2006 |
| WO | 2018/100141 A1 | 6/2018 |

* cited by examiner

|  |  | Occupant Body Size | |
| --- | --- | --- | --- |
|  |  | Small Body-Sized | Large Body-Sized |
| Collision Speed | Low/Middle Speed | Load Adding Unnecessary | Load Adding Necessary |
| | High Speed | Load Adding Necessary | Load Adding Necessary |

SEATBELT DEVICE FOR VEHICLE

BACKGROUND OF THE INVENTION

The present invention relates to a seatbelt device for a vehicle.

A vehicle, such as an automotive vehicle, is provided with a seatbelt device for the vehicle which restrains an occupant seated in a seat by means of a belt. When the vehicle has a sudden deceleration or an emergency, such as a collision, the occupant is restrained from moving forwardly by the seatbelt device for the vehicle, whereby the occupant is protected.

In this kind of seatbelt device for the vehicle, one end of the belt is fixed to a vehicle floor via an anchor member or the like, and the other end is supported by a retractor so as to be wound up. The retractor comprises a pretensioner mechanism to eliminate looseness of the belt by quickly winding up the belt in an emergency, a lock mechanism to restrict drawing of the belt from a spool in the emergency, and a load limiter mechanism to keep a restraint load by the belt when the lock mechanism is in operation under a specified load value.

In the emergency, the pretensioner mechanism and the lock mechanism of the retractor operate, so that the occupant is prevented from moving forwardly due to the inertia by the belt, whereby the occupant restraint at a seat is achieved. Further, when a tension of the belt reaches a specified value in a state where the lock mechanism is in operation, the load limiter mechanism operates so that the restraint load applied to a body of the occupant is kept under the specified load value.

As disclosed in Japanese Patent Laid-Open Publication No. 2015-128925, a load limiter mechanism comprising a torsion bar is known as the load limiter mechanism of the retractor. One end of the torsion bar is fixed to a locked portion to be locked by the lock mechanism, and the other end of the torsion bar is fixed to the spool. In this kind of load limiter mechanism, when the tension of the belt reaches the specified value in the state where the lock mechanism is in operation, the torsion bar is twisted and deformed, so that the spool is allowed to rotate to some extent. Thereby, the belt is allowed to be drawn to some extent, so that the restraint load applied to the body of the occupant is kept under the specified load value.

Further, as disclosed in Japanese Patent Laid-Open Publication No. 2015-054647, a load limiter mechanism comprising two torsion bars is known as the load limiter mechanism of the retractor as well. In this kind of load limiter mechanism, a first operation manner where one of the torsion bars operates only and a second operation manner where the both torsion bars operate are selectively executable. Accordingly, the first operation manner or the second operation manner is selectively executed in accordance with a situation, such as a body size of the occupant and deceleration in the emergency, whereby the appropriate restraint load in accordance with the situation is obtained.

However, in the retractor comprising the single torsion bar disclosed in the above-described first patent document, the value of the restraint load is fixed once the torsion bar is assembled, so that the restraint load in accordance with the situation, such as the occupant's body side and the emergency, may not be obtained in some cases. For example, in a case where the occupant is small body-sized or a collision speed is relatively low, an excessive restraint load is applied to the occupant's body, or in a case where the occupant is large body-sized or the collision speed is relatively high, the restraint load becomes smaller than the best magnitude.

Further, in the retractor comprising the two torsion bars disclosed in the above-described second patent document, a structure for switching the operation modes may be complex and the retractor may be improperly large-sized as a whole. Moreover, the layout flexibility of the retractor itself and its surrounding parts may be inferior.

SUMMARY OF THE INVENTION

Accordingly, an object of the present invention is to provide a seatbelt device for a vehicle which can optimize the restraint load in accordance with the occupant's body size and the emergency situation, suppressing complexity and a large size of the retractor's structure.

The present invention is a seatbelt device for a vehicle, comprising a belt restraining an occupant, a retractor supporting the belt so as to wind up one end of the belt, a frictional-force applier configured to apply a frictional force to the belt by contacting the belt, and an actuator to actuate the frictional-force applier so as to change the frictional force.

Herein, the above-described "frictional force" is a force to be caused by a friction which is generated between the frictional-force applier and the belt while the frictional-force applier contacts the belt, which serves as a resistance force against moving of the belt. Further, the above-described "change" of the frictional force includes changing from a state where the frictional force is not generated to another state where the frictional force is generated and changing from the state where the frictional force is generated to the other state where the frictional force is not generated.

According to the present invention, when the body of the occupant with the seatbelt moves forwardly in the emergency, such as the collision, the frictional-force applier is so actuated by the actuator that the frictional force can be generated between the belt and the frictional-force applier or the frictional force can be changed. Thereby, a moving speed of the belt in a drawing direction from the spool of the retractor is adjusted, so that the restraint load of the occupant by the belt can be optimized in accordance with the occupant's body size, a collision speed, and the like. Accordingly, suppressing the excessive restraint load from being applied to the occupant and effectively restraining the occupant can be compatibly attained easily, so that the protection performance of the occupant can be improved.

Further, according to the present invention, the frictional-force applier can be arranged at any position which is different from the retractor. Accordingly, the above-described restraint-load adjustment performance can be achieved, suppressing the structure of the retractor and its surrounding part from being complex or suppressing the layout flexibility around the retractor from being inferior.

In an embodiment of the present invention, the retractor comprises a spool where the belt is wound up, a lock mechanism to restrict rotation of the spool in a delivered direction of the belt, and a load limiter mechanism to keep a restraint load of the occupant which is achieved by the belt when the lock mechanism is in operation under a specified value.

According to this embodiment, when the body of the occupant moves forwardly in the emergency, restriction of the restraint load by means of the load limiter mechanism of the retractor and adjustment of the restraint load by means of the frictional-force applier are properly combined and performed, so that the restraint load applied to the occupant can be effectively optimized.

For example, in a case where the occupant is small body-sized or the collision speed is relatively low, it is preferable that the frictional-force applier be spaced apart from the belt or the frictional force which is relatively low be made to be applied between the belt and the frictional-force applier. In this case, delivery of the belt from the spool in a state where the lock mechanism operates is so promoted that the restriction of the restraint load by means of the load limiter mechanism is advanced, so that the restraint load which is relatively low in accordance with the body size of the occupant, the collision speed, and the like can be obtained.

In a case where the occupant is large body-sized or the collision speed is relatively high, it is preferable that the frictional force be generated between the belt and the frictional-force applier or the frictional force be increased. In this case, delivery of the belt from the spool in a state where the lock mechanism operates is so restricted that the restriction of the restraint load by means of the load limiter mechanism is suppressed, so that the restraint load which is relatively high in accordance with the body size of the occupant, the collision speed, and the like can be obtained.

Moreover, actuating of the frictional-force applier by the actuator can be controlled separately from respective operations of the lock mechanism and the load limiter mechanism of the retractor. Accordingly, the frictional-force applier can be actuated so that the restraint load according to the emergency situation is obtained at the timing the emergency situation is detected.

In another embodiment of the present invention, the frictional-force applier comprises a first contact portion which is contactable with one of surfaces of the belt and a second contact portion which is contactable with the other surface of the belt.

According to this embodiment, the frictional force can be applied to both surfaces of the belt by making the first contact portion and the second contact portion contact the belt, respectively, when the frictional-force applier operates. Thereby, adjusting of the restraint load by applying the frictional force can be securely attained.

In another embodiment of the present invention, the frictional-force applier comprises support portions which support the first contact portion and the second contact portion, and the actuator is configured to rotationally drive the support portions between a first rotational position where the first contact portion and the second contact portion apply a first frictional force to the belt by contacting the belt and a second rotational position where the first contact portion and the second contact portion apply a second frictional force, which is greater than the first frictional force, to the belt by contacting the belt.

Herein, the "first frictional force" and the "second frictional force" are respectively the sums of a frictional force generated between the first contact portion and the belt and a frictional force generated between the second contact portion and the belt. Further, the magnitude of the "first frictional force" may be zero.

According to this embodiment, the frictional force applied to the belt can be changed by a simple structure in which the support portions which support the first contact portion and the second contact portion are rotated between the first rotational position and the second rotational position.

In another embodiment of the present invention, the seatbelt device for the vehicle further comprising a detector to detect at least one of a vehicle speed when an impact load which is greater than a specified value is inputted to the vehicle and a body size of the occupant, and a controller configured to control the actuator such that the frictional force which depends on detection result of the detector is applied to the belt by the frictional-force applier.

According to this embodiment, the restraint load according to at least one of the vehicle speed and the body size of the occupant can be obtained in the emergency, such as the collision, so that the occupant protection can be effectively achieved.

Other features, aspects, and advantages of the present invention will become apparent from the following description which refers to the accompanying drawings.

DETAILED DESCRIPTION OF THE INVENTION

Hereafter, embodiments of a seatbelt device for a vehicle according to the present invention will be described.

Embodiment 1

Figure 1:
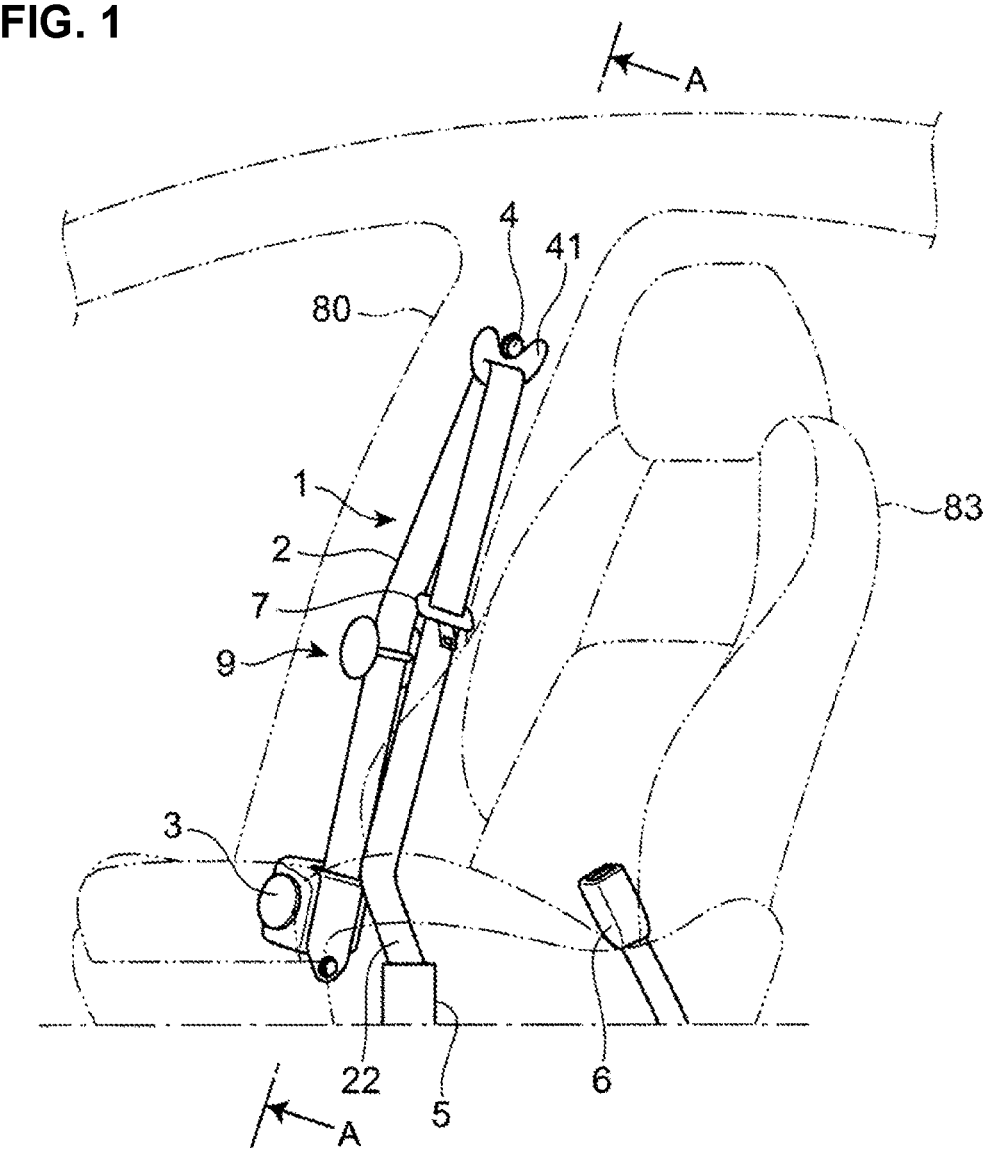
FIG. 1 is a schematically structural diagram of a seatbelt device for a vehicle according to a first embodiment of the present invention.

As shown in FIG. 1, the seatbelt device 1 is a so-called three-point type of seatbelt which is provided at a front seat of a vehicle. The seatbelt device 1 comprises a belt 2, a retractor 3, an upper anchor 4, a lower anchor 5, a buckle 6, and a tongue plate 7.

The retractor 3 is arranged near a lower end of a center pillar 80. The upper anchor 4 is arranged near an upper end of the center pillar 80. A D ring 41 is attached to the upper anchor 4. A lower anchor 5 is arranged adjacently to an outward side, in a vehicle width direction, of a seat 83. The buckle 6 is arranged adjacently to an inward side, in the vehicle width direction, of the seat 83.

One end portion 21 of the belt 2 is supported at a spool 31 (see FIG. 3) of the retractor 3 so that it is wound up, and the other end portion 22 of the belt 2 is fixed to a vehicle floor via the lower anchor 5 and the like. The D ring 41 and a tongue plate 7 are provided such that the belt 2 is inserted into these members 41, 7 between the retractor 3 and the lower anchor 5.

An occupant seated in the seat 83 applies the belt 2 by drawing the belt 2 from the retractor 3 and making the tongue plate 7 engage with the buckle 6. Thereby, a chest and a waist of the occupant are restrained by the belt 2 at the seat 83.

Figure 2:
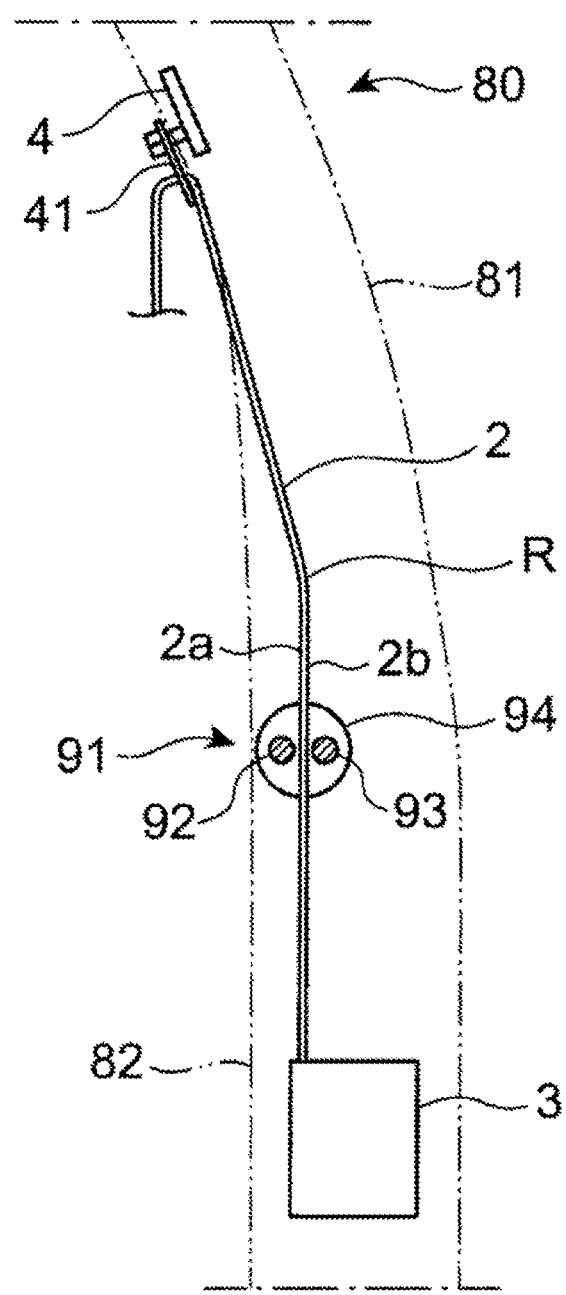
FIG. 2 is a schematic diagram taken along line A-A of FIG. 1.

As shown in FIG. 2, the retractor 3 is arranged between a center pillar outer 81 which constitutes the center pillar 80 and a trim member 82 which is arranged on a cabin-inside of the center pillar outer 81. Further, the D ring 41 is arranged along a cabin-inside surface of the trim member 82. Thereby, the belt 2 is provided such that its part located between the retractor 3 and the D ring 41 is arranged along a specified path R which is positioned between the center pillar outer 81 and the trim member 82.

Figure 3:
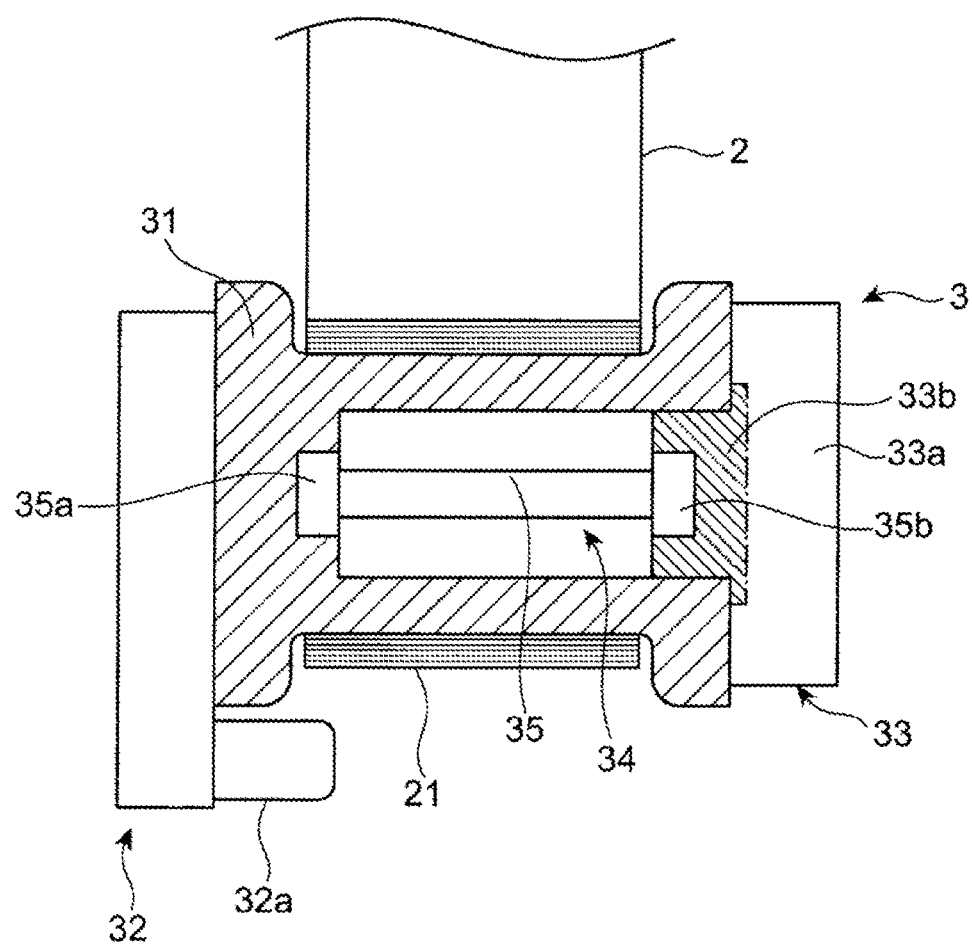
FIG. 3 is a schematic diagram of a retractor.

As shown in FIG. 3, the retractor 3 comprises the spool 31 which supports the belt 2 so as to wind up the one end portion 21 of the belt 2, a pretensioner mechanism 32 which eliminates looseness of the belt 2 by making the spool 31 quickly wind up the belt 2 in an emergency, such as a vehicle collision, a lock mechanism 33 which restricts drawing of the belt 2 from the spool 31 in the emergency, and a load limiter mechanism 34 which restricts a restraint load when the lock mechanism 33 is in operation.

The pretensioner mechanism 32 comprises a known mechanism to immediately restrain the occupant at the seat 83 when a large impact is applied to the vehicle in the vehicle collision or the like. The pretensioner mechanism 32 draws the belt 2 into the retractor 3 by rotating the spool 31 by means of thrust of a gas generator 32a. Herein, an operation of the gas generator 32a of the pretensioner mechanism 32 is controlled by a control unit 100 which will be described later.

The lock mechanism 33 comprises a lock portion 33a which is fixed to a vehicle body via a case of the retractor 3 (not illustrated) or the like and a locked portion 33b which is connected to the spool 31 of the retractor 3. When the lock mechanism 33 operates in the emergency, the lock portion 33a restricts rotation of the locked portion 33b, so that drawing of the belt 2 from the spool 31 is restricted.

Any known mechanism is applicable as the lock mechanism 33. That is, the lock mechanism 33 may be configured to mechanically operate when the belt 2 is drawn at a speed higher than a specified value or to operate according to a control signal from the control unit 100 which will be described later.

The load limiter mechanism 34 is configured to keep the restraint load applied to the occupant under a specified load value when a tension of the belt 2 reaches a specified value in a state where the lock mechanism 33 is in operation. The load limiter mechanism 34 comprises a torsion bar 35 which is inserted into an inside of the spool 31. The torsion bar 35 is provided such that its one end portion 35a is fixed to the spool 31 and its other end portion 35b is fixed to the locked portion 33b. When the tension of the belt 2 increases to the specified value in the state where the lock mechanism 33 is in operation, the torsion bar 35 is twisted and deformed, so that the spool 31 is allowed to rotate to some extent. Thereby, the belt 2 is allowed to be drawn to some extent, so that the restraint load applied to the body of the occupant is kept under the specified load value.

Herein, in the performance of the load limiter mechanism 34 of the present embodiment, the above-described load is a load value which is appropriate to a case where a small body-sized occupant is restrained at a low-middle speed state in which the vehicle speed in the collision is a specified speed or lower.

As shown in FIG. 2, a restraint-load applying device 9 which applies a restraint load for restraining the occupant by the belt 2 at the seat 83 is provided on the above-described path R of the belt 2. The restraint-load applying device 9 is arranged between the center pillar outer 81 and the trim member 82. The restraint-load applying device 9 is attached to the center pillar 80 via a bracket (not illustrated), for example.

Figure 4:
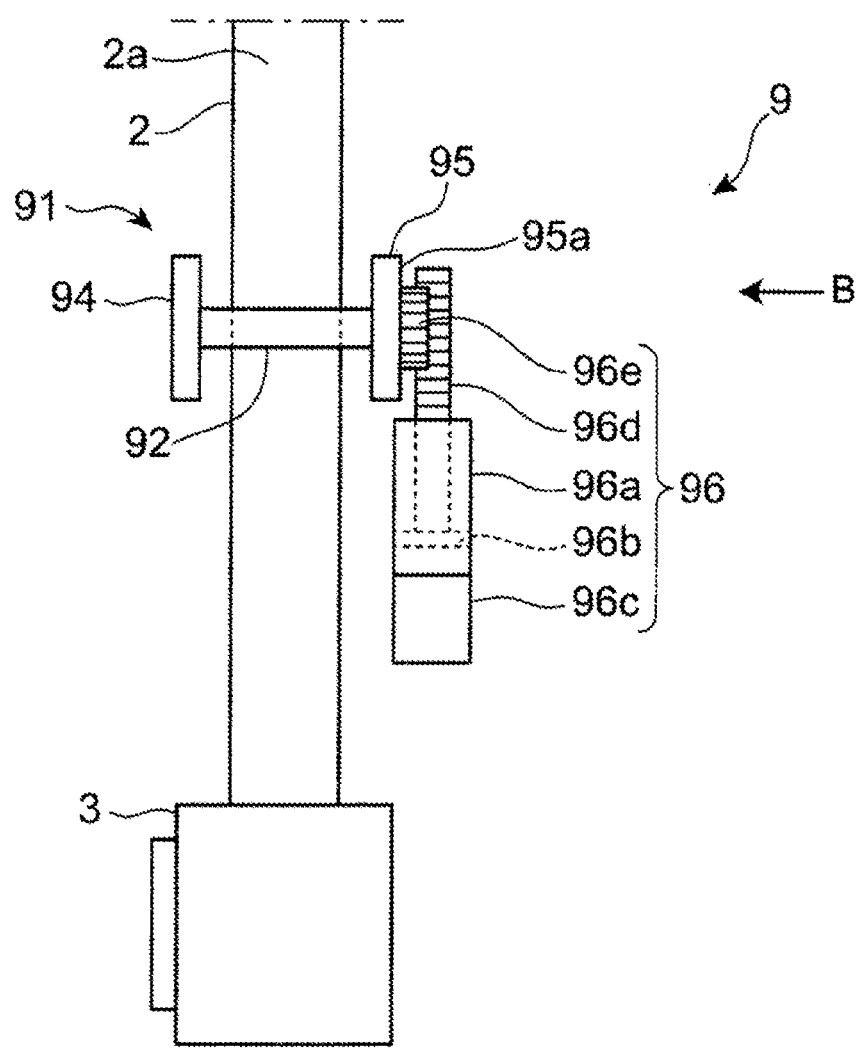
FIG. 4 is a schematic diagram of a restraint-load applying device of the first embodiment.

The restraint-load applying device 9 will be described specifically referring to FIGS. 4 and 5.

The restraint-load applying device 9 comprises a frictional-force applier 91 which applies a frictional force to the belt 2 by contacting the belt 2 and a driving mechanism 96 as an actuator to actuate the frictional-force applier 91.

The frictional-force applier 91 comprises a first shaft 92 as a first contact portion which is contactable with an inward-side surface 2a, in the vehicle width direction, of the belt 2 when being in operation, a second shaft 93 as a second contact portion which is contactable with an outward-side surface 2a, in the vehicle width direction, of the belt 2 when being in operation, and a pair of support members 94, 95 as support portions which support the both shafts 92, 93.

The pair of support members 94, 95 comprise the forward-side support member 94 which is arranged on the vehicle forward side and a rearward-side support member 95 which is arranged on the vehicle rearward side, interposing the belt 2 therebetween. The forward-side support member 94 and the rearward-side support member 95 are arranged such that they face each other. The forward-side support member 94 and the rearward-side support member 95 are respectively made of a discotic plate member, for example.

The first shaft 92 and the second shaft 93 are provided to extend between the pair of the support members 94, 95. The first shaft 92 is arranged on the inward side, in the vehicle width direction, of the belt 2, and the second shaft 93 is arranged on the outward side, in the vehicle width direction, of the belt 2. The first shaft 92 and the second shaft 93 are arranged in parallel to each other. Respective forward-side end portions 92a, 93a of the first and second shafts 92, 93 are fixed to the forward-side support member 94 by welding or the like, and the respective rearward end portions 92b, 93b of the first and second shafts 92, 93 are fixed to the rearward-side support member 95 by welding or the like.

The driving mechanism 96 is arranged on the outward side, in the vehicle width direction, of the rearward-side support member 95 of the frictional-force applier 91. The driving mechanism 96 comprises a cylinder 96a which is a cylindrical body with a bottom, a piston 96b which is provided in the cylinder 96a so as to slide, and a micro gas generator 96c which generates gas inside a space partitioned by the cylinder 96a and the piston 96b.

Further, the driving mechanism 96 comprises a rack-gear portion 96d which is fixed to the piston 96b at its one end and arranged so as to be exposed to the outside of the cylinder 96a and a pinion-gear portion 96e which is fixed to a face 95a of the rearward-side support member 95 of the frictional-force applier 91 which is positioned on an antiside of the shafts 92, 93 and engages with the rack-gear portion 96*d*.

Herein, the rack-gear portion 96*d* may be formed integrally with the piston 96*b*, and the pinion-gear portion 96*e* may be formed integrally with the rearward-side support member 95.

An axial center of the pinion-gear portion 96*e* is arranged in parallel to the first shaft 92 and the second shaft 93. When viewed from an axial direction, the axial center of the pinon-gear portion 96*e* is arranged at a center of an imaginary line which interconnects a shaft center of the first shaft 92 and a shaft center of the second shaft 93, for example.

Figure 6:
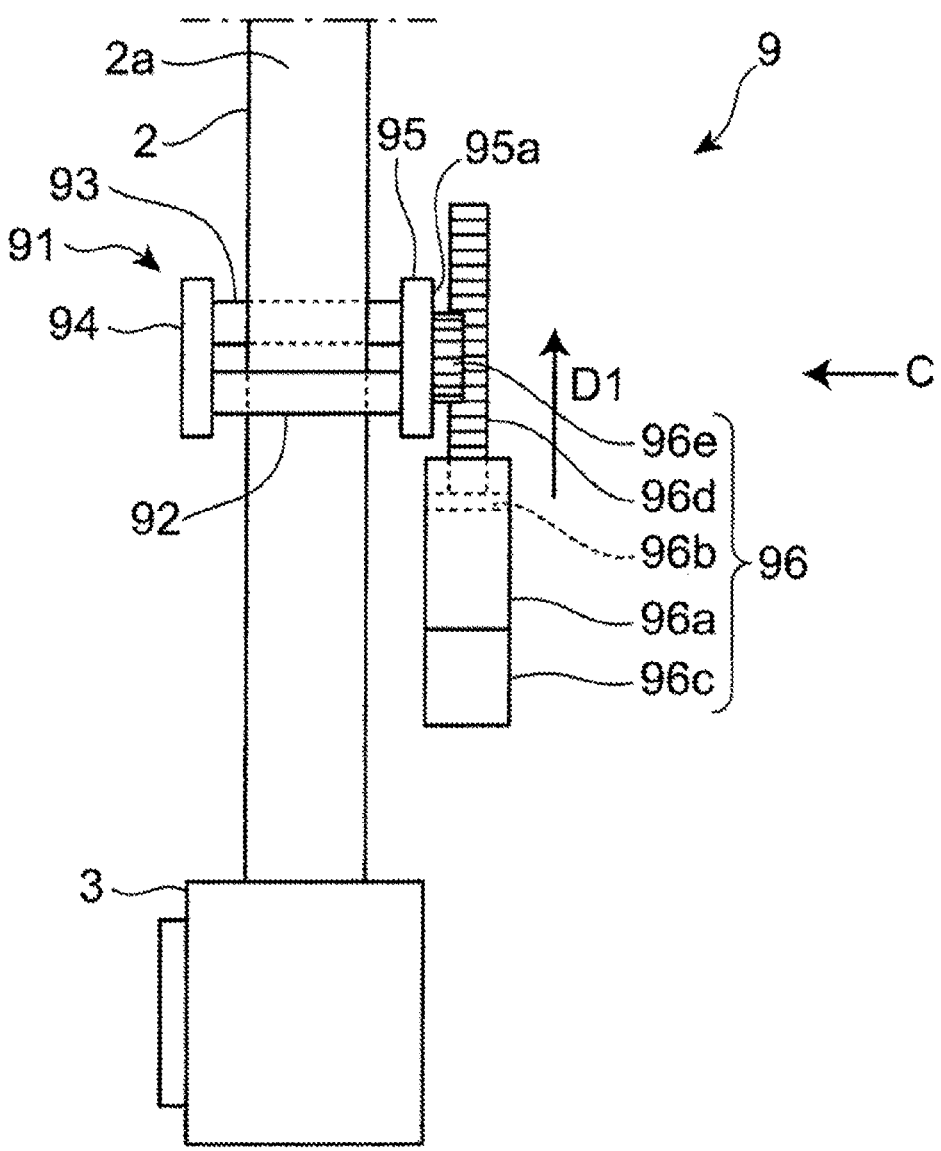
FIG. 6 is an explanatory diagram of the restraint-load applying device of the first embodiment which is in operation.

An operation of the restraint-load applying device 9 will be described referring to FIGS. 6 and 7.

When the micro gas generator 96*c* operates based on a control signal from the control unit 100, which will be described later, in the vehicle collision or the like, the piston 96*b* and the rack-gear portion 96*d* are made to slide in an arrow D1 direction of FIGS. 6 and 7 by pressure of the gas generated in the cylinder 96*a* of the driving mechanism 96. Thereby, the pinion-gear portion 96*e* which engages with the rack-gear portion 96*d* is rotated in an arrow D2 direction of FIG. 7.

Accordingly, the rearward-side support member 95 is driven and rotated in the arrow D2 direction around the axial center of the pinion-gear portion 96*e* together with the pinion-gear portion 96*e*.

Figure 5:
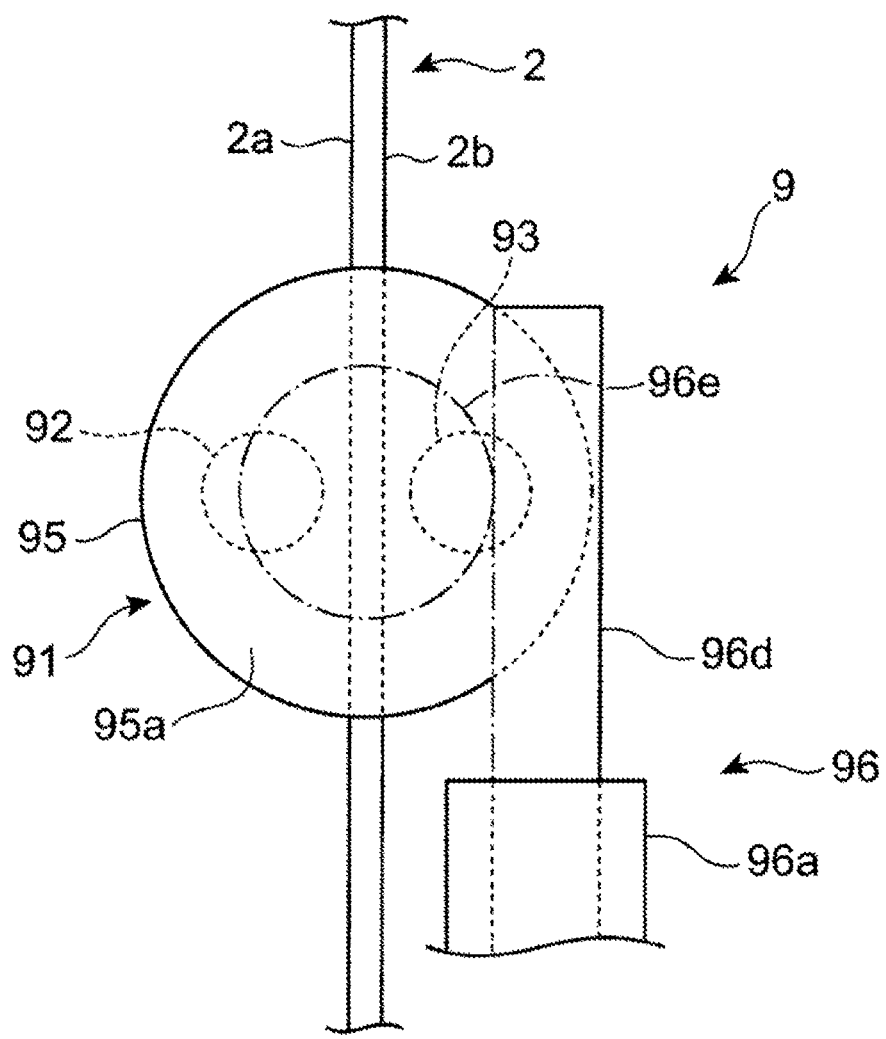
FIG. 5 is a view on arrow B of FIG. 4.

As shown in FIG. 5, in an initial state where the restraint-load applying device 9 is not in operation, the frictional-force applier 91 is arranged at a first rotational position P1 which makes the first shaft 92 and the second shaft 93 be spaced apart from the belt 2, respectively. At this first rotational position P1, the first shaft 92 and the second shaft 93 are arranged side by side in the vehicle width direction substantially at the same level.

Figure 7:
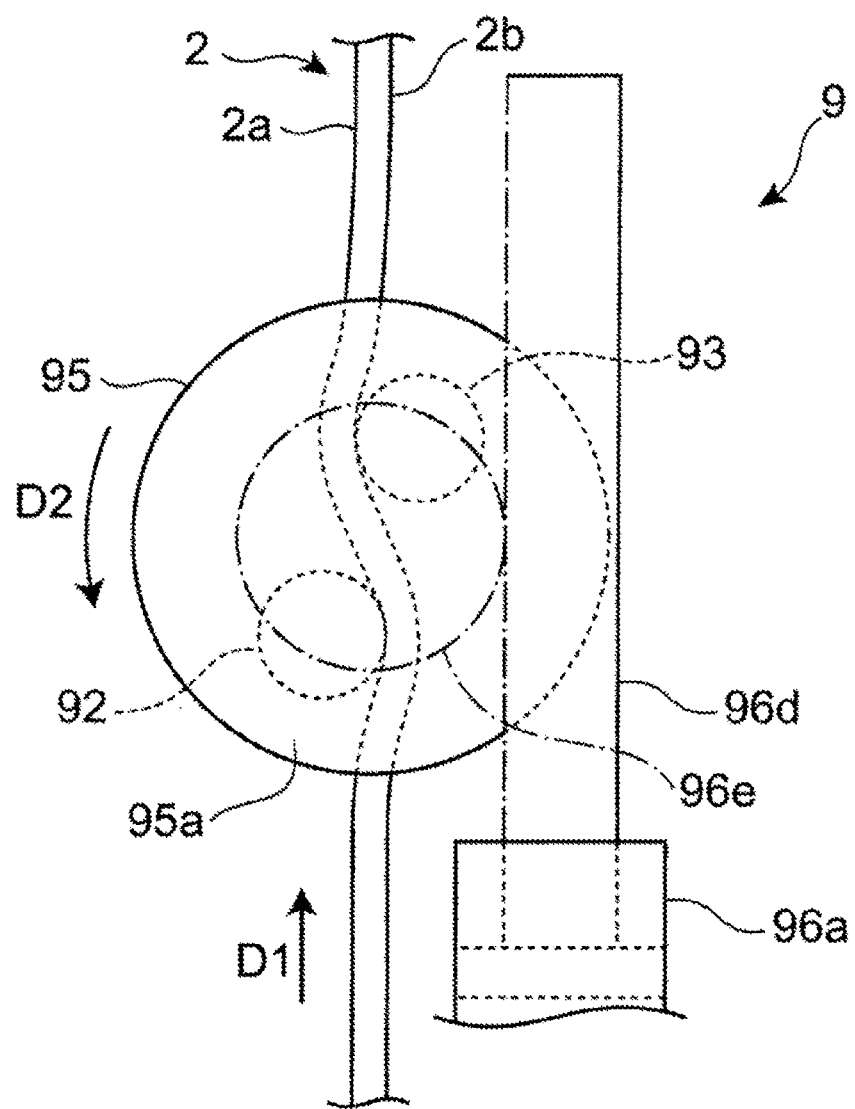
FIG. 7 is a view on arrow C of FIG. 6.

Meanwhile, as shown in FIG. 7, in a state where the operation of the restraint-load applying device 9 is complete, the frictional-force applier 91 is arranged at a second rotational position P2 which makes the first shaft 92 and the second shaft 93 contact the belt 2. In this second rotational position P2, the first shaft 92 and the second shaft 93 are offset from each other in the vertical direction such that they overlap each other in the vehicle width direction.

Herein, the first shaft 92 contacts the inward-side face 2*a* of the belt 2 and the second shaft 93 contacts the outward-side face 2*b* of the belt 2, so that a frictional force is generated between the belt 2 and each of the first and second shafts 92, 93.

At the first rotational position P1 of the present embodiment, since the both shafts 92, 93 are spaced apart from the belt 2, the value of the frictional force generated between the belt 2 and the shafts 92, 93 is zero. However, a first frictional force N1 which is greater than zero may be generated between the belt 2 and the shafts 92, 93 at the first rotational position P1. In this case, it is preferable that a second frictional force N2 which is greater than the first frictional force N1 be generated between the belt 2 and the shafts 92, 93 at the second rotational position P2.

Figure 8:
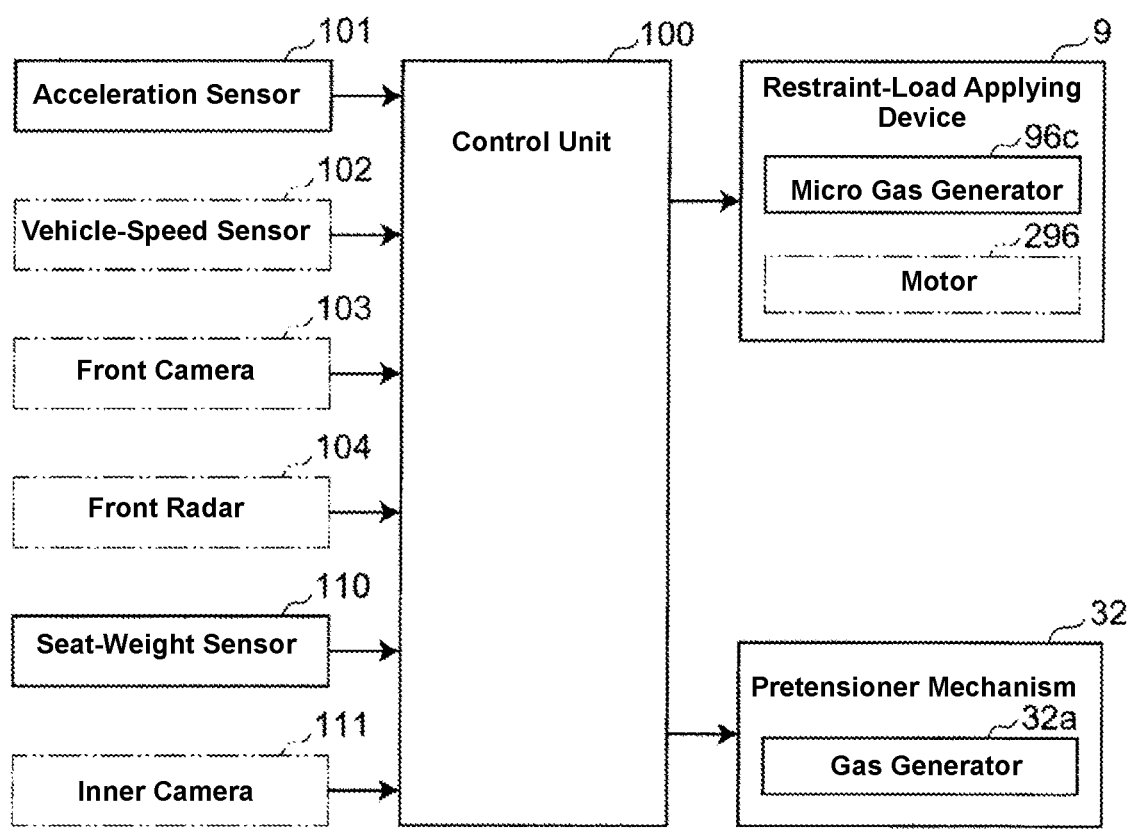
FIG. 8 is a system diagram of the seatbelt device for the vehicle.

As shown in FIG. 8, the seatbelt device 1 of the present embodiment comprises the control unit 100 which controls the restraint-load applying device 9 and the pretensioner mechanism 32. The control unit 100 controls respective operations of the gas generator 32*a* to operate the pretensioner mechanism 32 and the micro gas generator 96*c* to operate the restraint-load applying device 9 based on output signals from an acceleration sensor 101 and a seat-weight sensor 110, for example, according to the state of the emergency.

A detection value of the acceleration sensor 101 is used for determining existence of the collision and a collision speed. Herein, a vehicle-speed sensor 102, a front camera 103, and a front radar 104 may be used in addition to or in place of the acceleration sensor 101 in these determinations. A detection value of the seat-weight sensor 110 is used for determining the body size of the occupant. Herein, an inner camera 111 may be used in addition to or in place of the seat-weight sensor 110 in this determination.

Next, an example of the control operation of the seatbelt device 1 will be described referring to a flowchart of FIG. 9 primarily.

In step S1, various kinds of information are read in. The information read in the step S1 include the detection value of the acceleration sensor 101 and the detection value of the seat-weight sensor 110.

In the next step S2, it is determined whether or not the vehicle collision occurs based on the detection value of the acceleration sensor 101 which has been read in the step S1. When no occurrence of the vehicle collision is determined in the step S2, the processing ends.

Meanwhile, when the occurrence of the vehicle collision is determined in the step S2, the gas generator 32*a* of the pretensioner mechanism 32 is made to operate in step S3. Thereby, the belt 2 is wound up immediately, so that the looseness of the belt 2 is eliminated. Then, in step S4, the lock mechanism 33 operates to restrict delivery of the belt 2 from the retractor 3, so that the occupant is prevented from moving forwardly due to the inertia.

The control operation of the step S4 is omitted as long as the lock mechanism is a type which mechanically operates according to a drawing speed of the belt 2 or the like, not a type which operates based on the control signals from the control unit 100. In any case, the lock mechanism 33 operates right after the pretensioner mechanism 32 operates.

Figure 9:
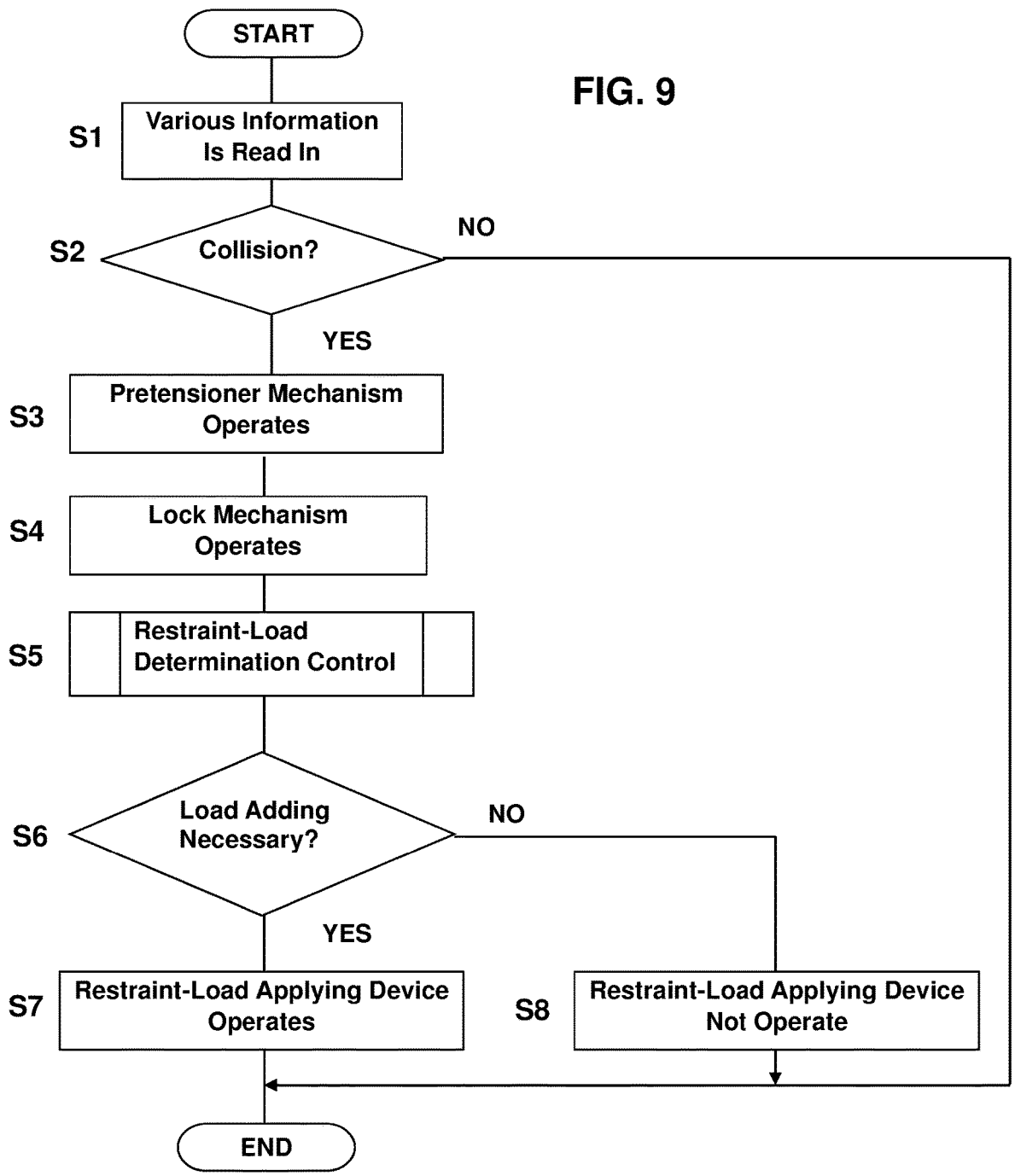
FIG. 9 is a flowchart showing a flow of a control of the seatbelt device for the vehicle according to the first embodiment.
Figure 10:
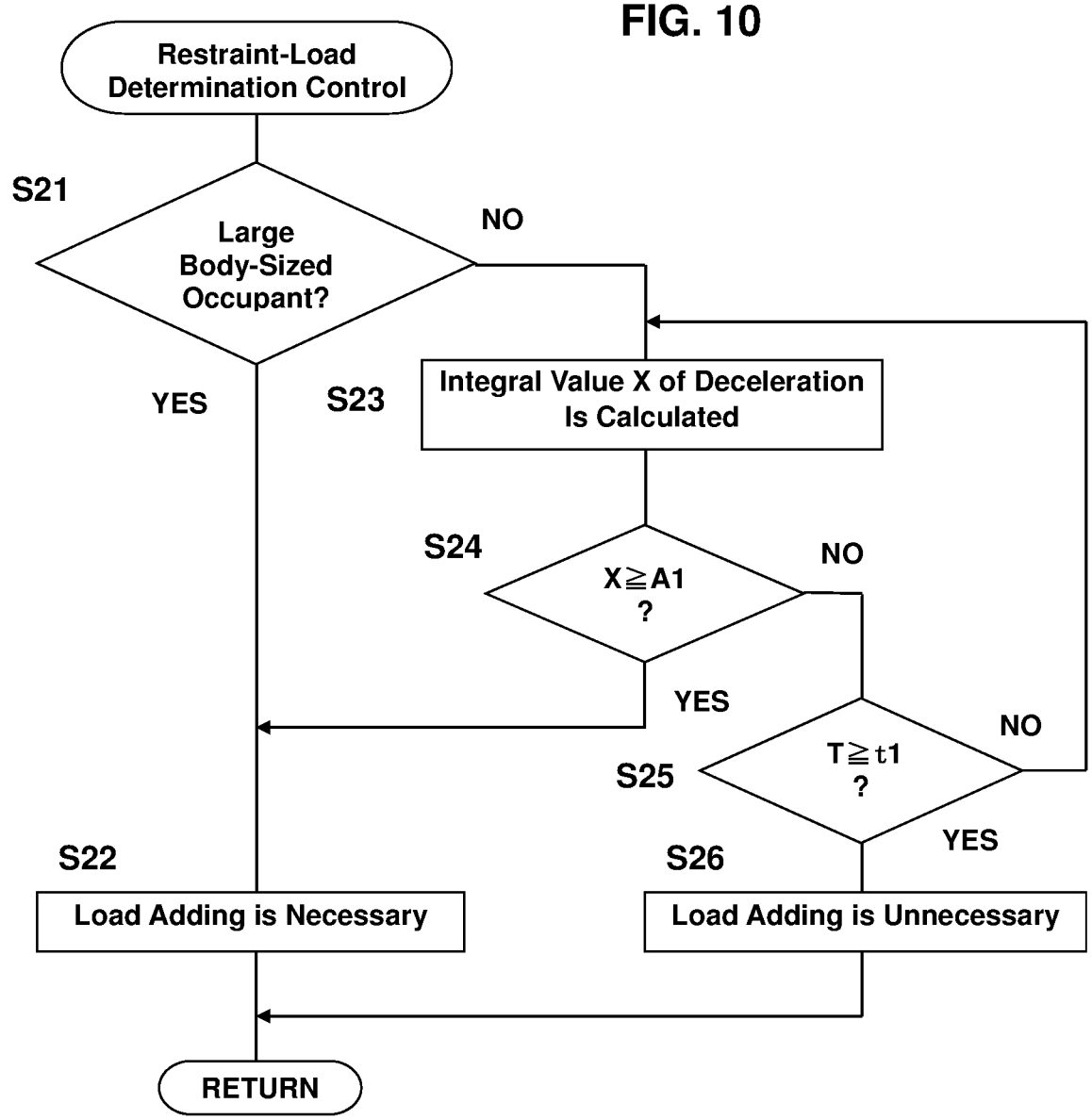
FIG. 10 is a flowchart showing a flow of a restraint-load determination control.

Each processing after step S5 in the main flow of FIG. 9 is executed according to results of a restraint-load determination control shown in a sub flow of FIG. 10. The processing after the step S5 in the sub flow of FIG. 10 and the main flow of FIG. 9 will be described later.

Herein, the restraint load of the belt 2 which the occupant requires in the collision differs according to the body size of the occupant (a large body size or not) and the collision speed (high-speed collision or not), in particular. Accordingly, the present embodiment is configured such that restriction of the restraint load by the load limiter mechanism 34 is performed regardless of the body size of the occupant and the collision speed, and adding of the restraint load by the restraint-load applying device 9 is appropriately performed according to the body size of the occupant and the collision speed.

The body size of the occupant is determined based on the weight of the occupant which is detected by the seat-weight sensor 110, for example. Specifically, in a case where the detection value of the seat-weight sensor 110 is a specified value or greater, it is determined that the occupant is a large body-sized one, whereas in a case where the detection value is smaller than the specified value, it is determined that the occupant is a small body-sized one.

Figures 11, 12:
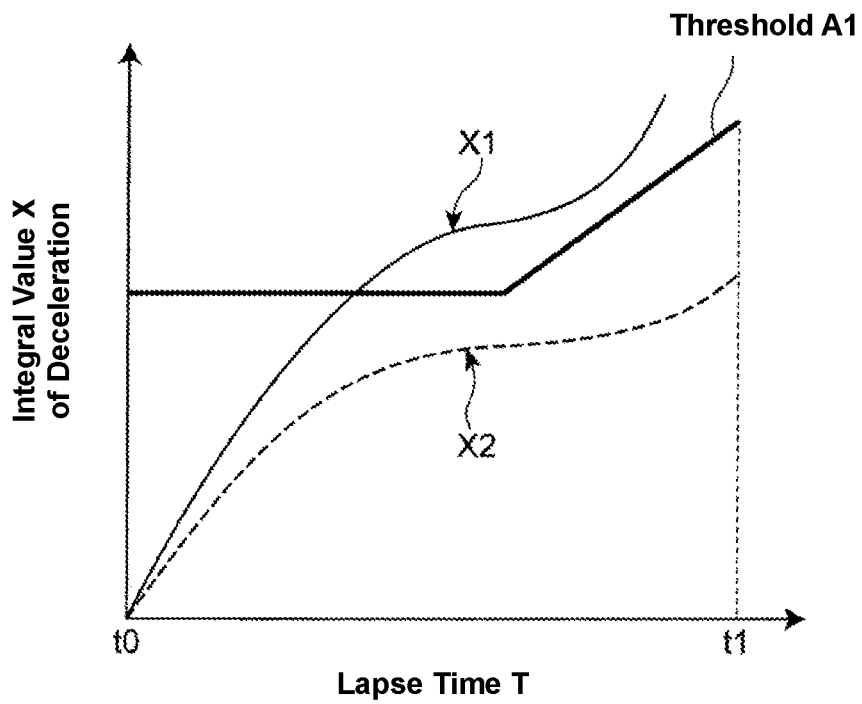
FIG. 11 is a graph for determining a collision speed.
FIG. 12 is a chart for determining an operation of the restraint-load applying device.

The collision speed is determined by using a control map shown in FIG. 11. The control map shown in FIG. 11 shows a relation of an integrated value X of deceleration of the vehicle to a lapse time T from a collision starting time t0. The control map of FIG. 11 includes a threshold A1 which has been previously set, and it is determined whether the collision is a high-speed collision or a low/middle-speed collision based on a relation of the integrated value X of the actual deceleration of the vehicle to the threshold A1.

Specifically, as shown by reference character X1 in FIG. 11, in a case where the integrated value X of the deceleration of the vehicle reaches the threshold A1 or greater when the lapse time T becomes a specified time t1, it is determined that the collision is the high-speed one. Meanwhile, as shown by reference character X2, in a case where the integrated value X of the deceleration of the vehicle is smaller than the threshold A1 when the lapse time T becomes the specified time t1, it is determined that the collision is the low/middle-speed one.

As shown in FIG. 12, it is determined by combination of the body size of the occupant and the collision speed whether or not adding of the restraint load by the restraint-load applying device 9 is necessary.

In the present embodiment, the restraint load of the occupant by the load limiter mechanism 34 is set to be the best in a case where the occupant is the small body-sized one and the collision is the low/middle one as described above. Accordingly, in a case where the occupant is the large body-sized one, it is determined regardless of the collision speed that adding of the restraint load is necessary. Further, in a case where the occupant is the small body-sized one and the collision is the high-speed one as well, it is determined that adding of the restraint load is necessary. Meanwhile, in a case where the occupant is the small body-sized one and the collision is the low/middle-speed one, it is determined that adding of the restraint load is unnecessary.

A flow of the restraint-load determination control (the step S5 in FIG. 9) will be described referring to the flowchart of FIG. 10.

First, it is determined whether or not the occupant is large body-sized in step S21. The body size of the occupant is determined based on whether or not the detection value of the seat-weight sensor 110 is a predetermined specified value or greater, for example. In a case where it is determined that the occupant is large body-sized, it is determined in step S22 that adding of the restraint load is necessary, and the processing returns to the main flow of FIG. 9.

Meanwhile, in a case where it is determined in the step S21 that the occupant is not large body-sized, the integrated value X of the deceleration of the vehicle is calculated in step S23. In the next step S24, it is determined whether or not the integrated value X of the deceleration of the vehicle is the threshold A1 or greater. In a case where the calculated integrated value X is the threshold A1 or greater, the processing advances to step S22, where it is determined that adding of the restraint load is necessary, and the processing returns to the main flow of FIG. 9.

In a case where it is determined in the step S24 that the integrated value X of the deceleration is smaller than the threshold A1, the processing proceeds to step S25, where it is determined whether or not the lapse time T from the collision-occurrence point t0 becomes the specified time t1 or greater. In a case where the lapse time T is the specified time t1 or greater, the processing proceeds to step S26, where it is determined that adding of the restraint load is unnecessary, and the processing returns to the main flow of FIG. 9.

Meanwhile, in a case where it is determined in the step S25 that the lapse time T does not become the specified time t1, the processing returns to the step S23, where the integrated value X of the deceleration is calculated again. Then, the processing of the steps S23-S25 are repeated until it is determined in the step S24 that the integrated value X of the deceleration reaches the threshold A1 or greater or it is determined in the step S25 that the lapse time T becomes the specified time t1.

Returning to the main flow of FIG. 9, the processing after the step S5 will be descried. In the step S5, the restraint-load determination control is executed as described above (see FIG. 10). In the next step S6, it is determined whether or not adding of the restraint load is necessary based on results of the restraint-load determination control (the step S22 and the step S26 of FIG. 10). In a case where it is determined in the step S6 that adding of the restraint load is necessary, the restraint-load applying device 9 is made to operate in step S7, and the control flow ends.

Meanwhile, in a case where it is determined in the step S6 that adding of the restraint load is unnecessary, the restraint-load applying device 9 is kept in a state where this device 9 is not in operation in step S8, and the control flow ends.

As described above, according to the present embodiment, the restraint load applied to the occupant by the belt 2 can be optimized by appropriately combining the restriction of the restraint load by means of the load limiter mechanism 34 and the addition of the restraint load by means of the restraint-load applying device 9.

Specifically, in a case where the occupant is small body-sized or the collision speed is relatively low, the state where the first and second shafts 92, 93 of the frictional-force applier 91 are spaced apart from the belt 2 is kept, so that the frictional force is not generated between the belt 2 and the first and second shafts 92, 93 (see FIG. 5). Accordingly, delivery of the belt 2 from the spool 31 in the state where the lock mechanism 33 is in operation is so promoted that the restriction of the restraint load by means of the load limiter mechanism 34 is advanced, so that the restraint load which is relatively low in accordance with the body size of the occupant and the collision speed can be obtained.

Further, in a case where the occupant is large body-sized or the collision speed is relatively high, the frictional force is generated between the belt 2 and the first and second shafts 92, 93 (see FIG. 7). Accordingly, delivery of the belt 2 from the spool 31 in the state where the lock mechanism 33 is in operation is so restricted that the restriction of the restraint load by means of the load limiter mechanism 34 is suppressed, so that the restraint load which is relatively high in accordance with the body size of the occupant or the collision speed can be obtained.

Further, driving of the frictional-force applier 91 by the driving mechanism 96 can be controlled separately from the operations of the lock mechanism 33 and the load limiter mechanism 34 of the retractor 3. Accordingly, the frictional-force applier 91 can be actuated so that the restraint load according to the emergency situation is obtained at the timing the emergency situation is detected.

For example, in a case where the high-speed collision occurs as shown by the reference character X1 of FIG. 11, the time T from the collision-occurrence point t0 which is required for the determination of the high-speed collision is relatively short. In this case, the restraint-load applying device 9 operates so immediately at the timing the high-speed collision is determined that the addition of the restraint load by means of the restraint-load applying device 9 can be performed without delay.

Further, in a case where it is previously detected that the occupant is large body-sized, the restraint-load applying device 9 operates so immediately at the collision-occurrence timing that the necessary restraint load can be obtained quickly.

Meanwhile, as shown by the reference character X2 of FIG. 11, the lapse time from the collision-occurrence point t0 to the specified time t1 is required for the determination of the low/middle-speed collision. However, in the case of the low/middle-speed collision, the appropriate restraint load is obtained without of the operation of the restraint-load applying device 9 in the case of the small body-sized occupant, and the restraint-load applying device 9 operates immediately as described above in the case of the large body-sized occupant. Therefore, the restraint load can be optimized without delay in the low/middle-speed collision as well.

Moreover, accord to the present embodiment, the frictional-force applier 91 can be arranged at any position on the above-described path R of the belt 2 (see FIG. 2) which is spaced apart from the retractor 3. Accordingly, the above-described restraint-load adjustment performance by the frictional-force applier 91 can be achieved, suppressing the structure of the retractor 3 and its surrounding part from being complex or suppressing the layout flexibility around the retractor 3 from being inferior.

Embodiment 2

Next, a seatbelt device for a vehicle according to the second embodiment will be described referring to FIGS. 13-16. In the second embodiment, the same structures as the first embodiment are denoted by the same reference characters in FIGS. 13 and 14, descriptions of which are omitted.

Figure 13:
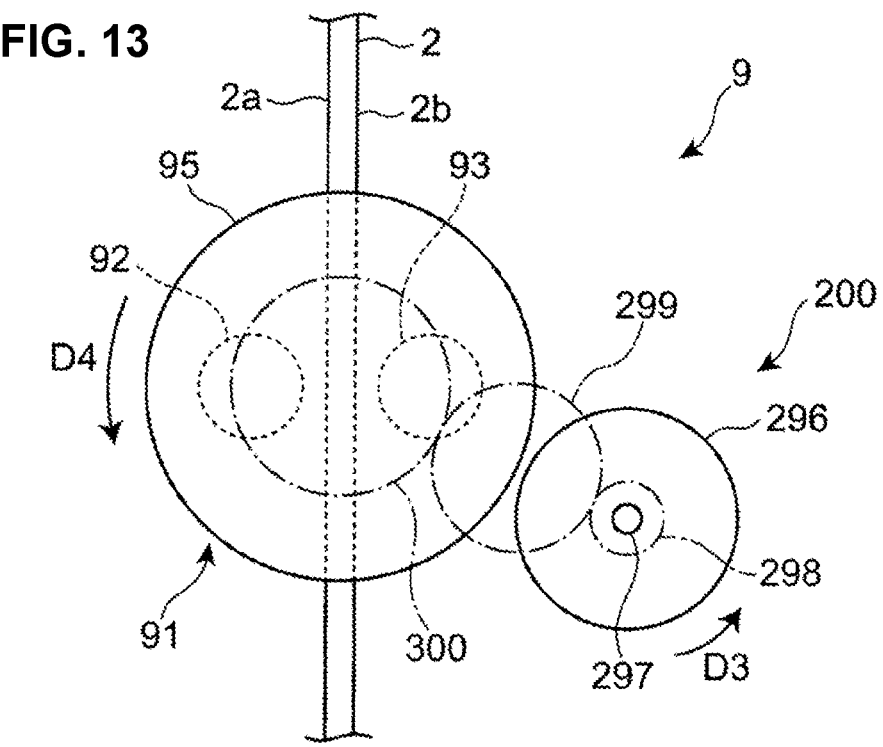
FIG. 13 is a schematic diagram of a restraint-load applying device of a seatbelt device for the vehicle according to the second embodiment of the present invention.

As shown in FIG. 13, the restraint-load applying device 9 of the seatbelt device for the vehicle comprises a driving mechanism 200 which is different from the driving mechanism 96 of the first embodiment. Specifically, the driving mechanism 200 of the second embodiment comprises a motor 296 as a driving resource. The operation of the motor 296 is controlled based on control signals from the above-described control unit 100 (see FIG. 8).

The driving mechanism 200 of the second embodiment comprises a driving gear 298 which is fixed to an output shaft 297 of the motor 296, an intermediate gear 299 which engages with the driving gear 298, and a driven gear 300 which is fixed to the rearward-side support member 95 and engages with the intermediate gear 299.

Herein, the driving mechanism 200 may be configured such that the intermediate gear 299 is omitted and the driving gear 298 engages with the driven gear 300 directly.

Figure 14:
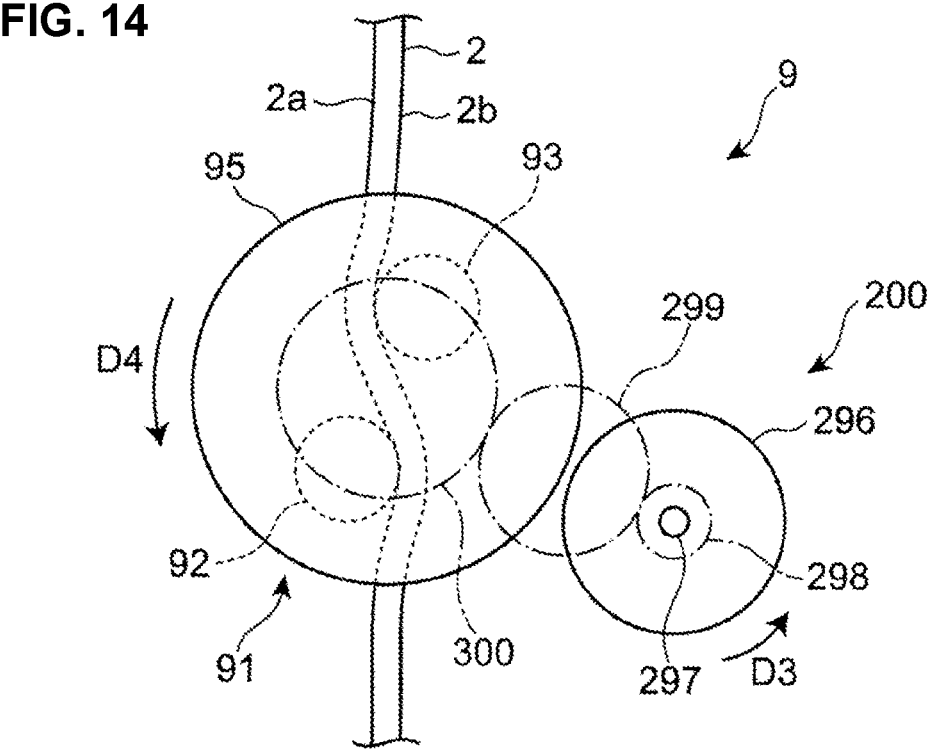
FIG. 14 is an explanatory diagram of the restraint-load applying device of the second embodiment which is in operation.

The operation of the restraint-load applying device 9 will be described referring to FIGS. 13 and 14.

When the motor 296 operates in the emergency, such as the collision, the driving gear 296 rotates in an arrow D3 direction. This rotation of the driving gear 298 is transmitted to the driven gear 300 by way of the intermediate gear 299. Thereby, the driven gear 300 rotates in an arrow D4 direction.

Herein, the frictional-force applier 91 is actuated and rotated in the arrow D4 direction around an axial direction of the driven gear 300 together with the driven gear 300. Similarly to the first embodiment, the rotational position of the frictional-force applier 91 is switchable between the first rotational position P1 which makes the first shaft 92 and the second shaft 93 be spaced apart from the belt 2, respectively, and the second rotational position P2 which makes the first shaft 92 and the second shaft 93 contact the belt 2.

Herein, the second embodiment may be configured as well such that the first and second shafts 92, 93 contact the belt 2 so as to generate the first frictional force N1 which has the value which is greater than zero between the belt 2 and the shafts 92, 93 at the first rotational position P1. In this case, it is preferable that the second frictional force N2 which has the value which is greater than the first frictional force N1 be generated between the belt 2 and the shafts 92, 93 at the second rotational position P2.

In the second embodiment, the positions of the first rotational position P1 and the second rotational position P2 can be adjusted by controlling a rotational angle of the motor 296. Accordingly, the magnitude of the "first frictional force N1" and the "second frictional force N2" can be adjusted by controlling the rotational angle of the motor 296, whereby the tension of the belt 2 can be adjusted at each of the first rotational position P1 and the second rotational position P2. Accordingly, the restraint load of the occupant by the belt 2 can be optimized more effectively by appropriately adjusting the rotational angle of the motor 296 in accordance with the body size of the occupant and the collision speed.

Figure 15:
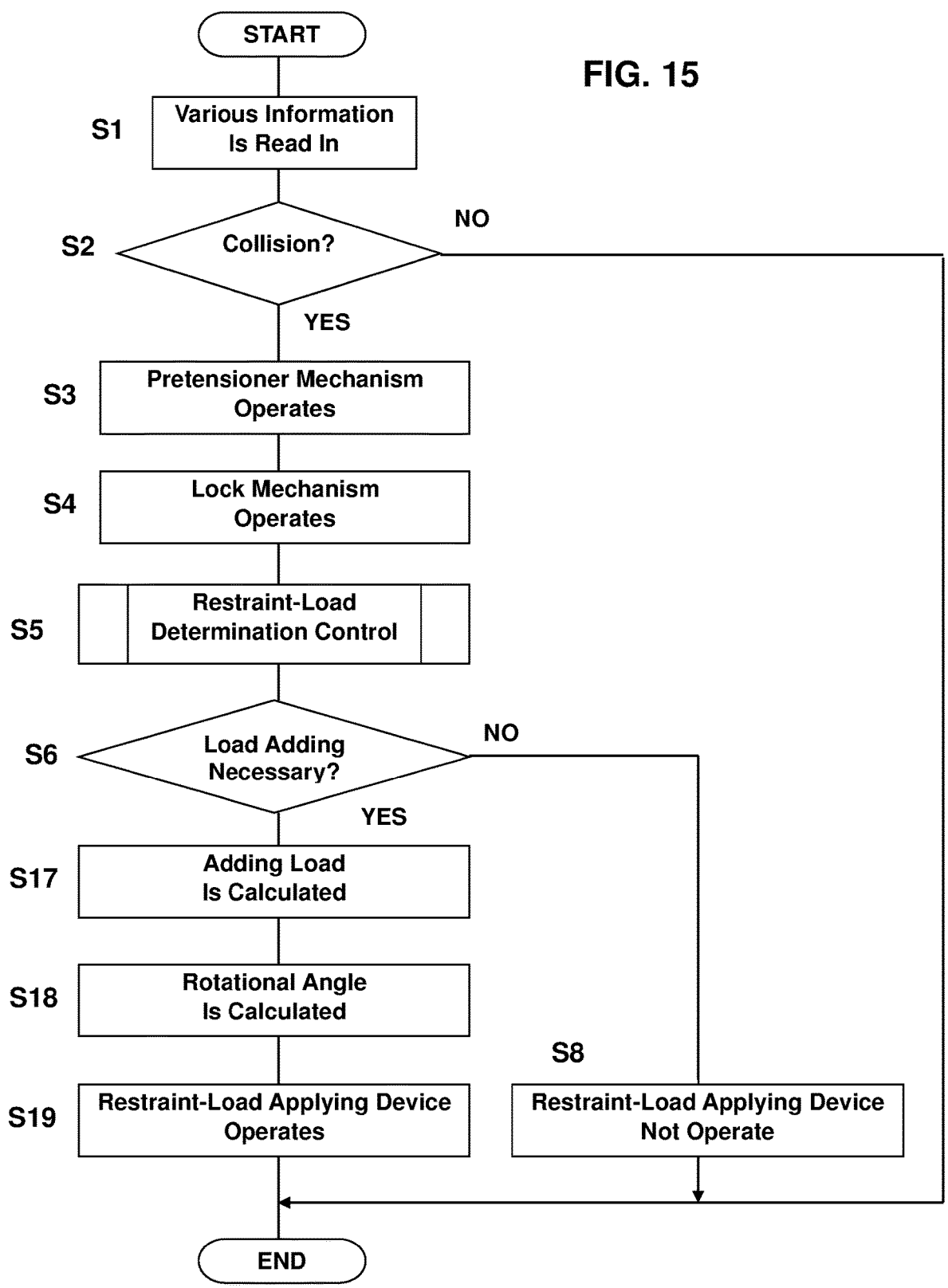
FIG. 15 is a flowchart showing a flow of a control of the seatbelt device for the vehicle of the second embodiment.

Next, an example of a control operation of the seatbelt device of the second embodiment will be described referring to a flowchart of FIG. 15.

Each processing of the steps S1-S6 is executed similarly to the control operation of the first embodiment shown in FIG. 9 in the control operation of the second embodiment as well. That is, when the vehicle has collision, the operation of the pretensioner mechanism 32 (the step S3), the operation of the lock mechanism 33 (the step S4), and the restraint-load determination control (the step S5) are executed.

The restraint-load determination control is, similarly to the first embodiment, executed according to the sub flow shown in FIG. 10, for example. Similarly to the first embodiment, it is determined in the step S6 whether or not adding of the restraint load is necessary based on the result of the restraint-load determination control executed in the step S5. In the case where it is determined from the result of the determination of the step S6 that adding of the restraint load is unnecessary, the restraint-load applying device 9 is not in operation (the step S8), similarly to the first embodiment.

Meanwhile, in the case where it is determined from the result of the determination of the step S6 that adding of the restraint load is necessary, the restraint load to be added by the restraint-load applying device 9 (hereafter, referred to as "adding load") is calculated in step S17. The adding load is calculated based on at least one of the body size of the occupant and the magnitude of the collision speed, for example, in the step S17. Specifically, an operation expression to calculate the adding load may be configured such that the adding load becomes larger as the detection value of the seat-weight sensor 110 becomes greater and/or the adding load becomes larger as a time required for the integrated value X of the vehicle deceleration detected by the acceleration sensor 101 to reach the threshold A1 is shorted, for example.

A rotational angle of the motor 296 which is required to apply the adding load calculated in the step S17 is calculated in the next step S18.

Figure 16:
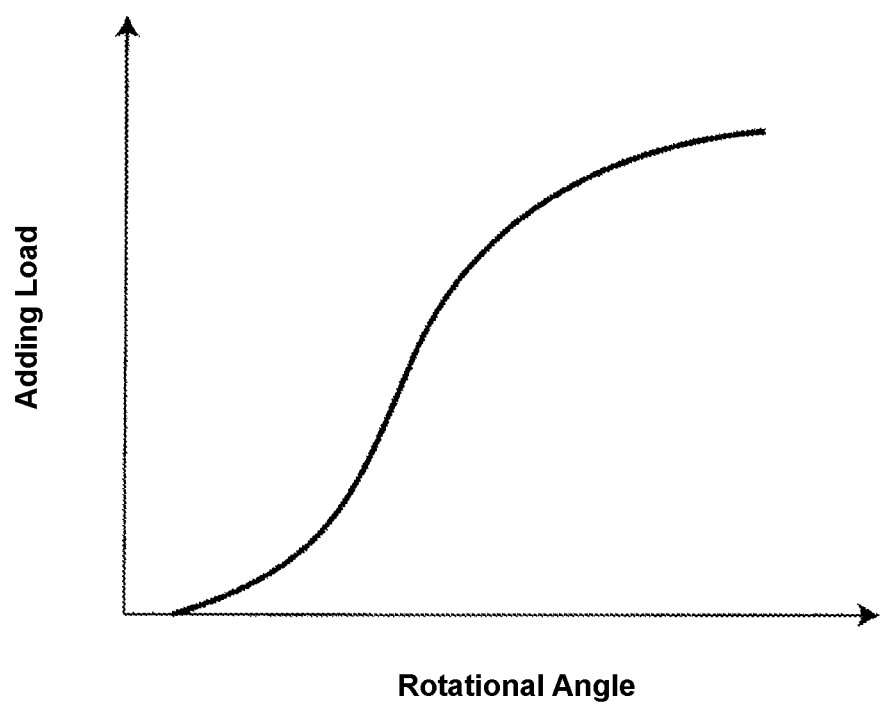
FIG. 16 is a graph showing a relation of a restraint load of a belt to a rotational speed of a frictional-force applier of the second embodiment.

Herein, a map showing a relation of the adding load to the rotational angle of the motor 296, as shown in FIG. 16, for example, is previously memorized in the control unit 100, and calculation of the step S18 is executed based on this map.

In step S19, the restraint-load applying device 9 is made to operate so that the motor 296 is driven at the rotational angle calculated in the step S18, and the control flow ends.

According to the second embodiment, similarly to the first embodiment, the restraint load applied to the occupant by the belt 2 can be optimized by appropriately combining the restriction of the restraint load by means of the load limiter mechanism 34 and the addition of the restraint load by means of the restraint-load applying device 9.

Moreover, since the rotational angle of the motor 296 is controlled appropriately, the restraint load can be optimized. Accordingly, the magnitude of the adding load by means of the restraint-load applying device 9 can change according to the continuously variable body size of the occupant, not to the two stages, such as the large body-sized occupant and the small body-sized occupant, and also according to the continuously variable collision speed, not to the two stages, such as the high-speed collision and the low/middle-speed collision.

Further, in a case where multiple collisions of vehicles occur, the adding load according to the collision speed in the second or more collisions can be provided by the restraint-load applying device 9.

While the seatbelt device for the vehicle according to the present invention has been described referring to the first and second embodiments, the present invention should not be limited to the above-described embodiments and any other modifications or improvements may be applied.

For example, while the acceleration sensor 101 is used for the collision determination, the vehicle-speed sensor 102 may be used in place of the acceleration sensor 101. In this case, the deceleration of the vehicle is calculated from the detection value of the vehicle-speed sensor 102, and in a case where this deceleration exceeds a specified threshold, the collision may be determined. Further, in addition to the acceleration sensor 101 and the vehicle-speed sensor 102, the front camera 103, the front radar 104, or the like may be used, so that the time for an own vehicle to collide with a preceding vehicle, an obstacle, or the like is predicted from the surrounding environment of the own vehicle, e.g., from the distance between the own vehicle and the preceding vehicle, the obstacle, or the like and a relative speed between the two. Then, the collision may be determined when this predicted time is a specified time or shorter.

Also, while the seat-weight sensor 110 is used for the determination of the body size of the occupant in the above-described embodiment, the inner camera 111 may be used in place of the seat-weight sensor 110. In this case, an image of the occupant is picked up by the inner camera 111, and the occupant's body size may be determined from this picked-up image data.

Moreover, while the so-called three-point type of seatbelt which is provided at the front seat is exemplified in the above-described embodiment, the present invention is not limited to this kind of seatbelt device, but a seatbelt device provided at the second-row or more-row seat of the vehicle or a so-called two-point type of seatbelt are applicable.

Further, the lock mechanism is provided at the retractor in the above-described embodiment, the lock function of the lock mechanism may be performed by the restraint-load applying device 9. In this case, the frictional-force applier 91 is preferably rotated so that a frictional force to lock drawing of the belt 2 can be generated between the frictional-force applier 91 and the belt 2 when a specified condition is met right after the operation of the pretensioner 32 in the collision or the like. Also, in the structure where the frictional-force applier 91 is rotated by the motor 296 like the second embodiment, the restraint load can be restricted or added by changing the rotational angle of the motor 296 after the above-described locking by the restraint-load applying device 9. Accordingly, the present invention is applicable to a case where the retractor does not comprise the lock mechanism nor the load limiter mechanism.

What is claimed is:

1. A seatbelt device for a vehicle, comprising:
   a belt restraining an occupant;
   a retractor supporting the belt so as to wind up one end of the belt;
   a restraint-load applying device including a frictional-force applier arranged apart from the retractor and configured to apply a frictional force to said belt by contacting the belt, and an actuator having a motor as a driving resource to actuate said frictional-force applier so as to change the frictional force; and
   a control unit configured to control the restraint-load applying device, the control unit configured to:
     calculate a restraint load to be added by the restraint-load applying device,
     calculate a rotational angle of the motor required to apply the calculated added restraint load, based on a predetermined relationship between the added restraint load and the rotational angle of the motor, and
     operate the restraint-load applying device so that the motor is driven at the calculated rotational angle.

2. The seatbelt device for the vehicle of claim 1, wherein said retractor comprises a spool where said belt is wound up, a lock mechanism to restrict rotation of said spool in a delivered direction of said belt, and a load limiter mechanism to keep a restraint load of the occupant which is achieved by the belt when said lock mechanism is in operation under a specified value.

3. The seatbelt device for the vehicle of claim 2, wherein said frictional-force applier comprises a first contact portion which is contactable with one of surfaces of said belt and a second contact portion which is contactable with the other surface of the belt.

4. The seatbelt device for the vehicle of claim 3, wherein said frictional-force applier comprises support portions which support said first contact portion and said second contact portion, and said actuator is configured to rotationally drive said support portions between a first rotational position where the first contact portion and the second contact portion apply a first frictional force to the belt by contacting the belt and a second rotational position where the first contact portion and the second contact portion apply a second frictional force, which is greater than said first frictional force, to the belt by contacting the belt.

5. The seatbelt device for the vehicle of claim 4, further comprising:
   a detector to detect at least one of a vehicle speed when an impact load which is greater than a specified value is inputted to the vehicle and a size of the occupant; and
   wherein the controller is configured to control said actuator such that the frictional force which depends on detection result of said detector is applied to said belt by said frictional-force applier.

6. The seatbelt device for the vehicle of claim 3, further comprising:
   a detector to detect at least one of a vehicle speed when an impact load which is greater than a specified value is inputted to the vehicle and a size of the occupant; and
   wherein the controller is configured to control said actuator such that the frictional force which depends on detection result of said detector is applied to said belt by said frictional-force applier.

7. The seatbelt device for the vehicle of claim 2, further comprising:
   a detector to detect at least one of a vehicle speed when an impact load which is greater than a specified value is inputted to the vehicle and a size of the occupant; and wherein the controller is configured to control said actuator such that the frictional force which depends on detection result of said detector is applied to said belt by said frictional-force applier.

8. The seatbelt device for the vehicle of claim 1, wherein said frictional-force applier comprises a first contact portion which is contactable with one of surfaces of said belt and a second contact portion which is contactable with the other surface of the belt.

9. The seatbelt device for the vehicle of claim 8, wherein said frictional-force applier comprises support portions which support said first contact portion and said second contact portion, and said actuator is configured to rotationally drive said support portions between a first rotational position where the first contact portion and the second contact portion apply a first frictional force to the belt by contacting the belt and a second rotational position where the first contact portion and the second contact portion apply a second frictional force, which is greater than said first frictional force, to the belt by contacting the belt.

10. The seatbelt device for the vehicle of claim 9, further comprising:
a detector to detect at least one of a vehicle speed when an impact load which is greater than a specified value is inputted to the vehicle and a size of the occupant; and
wherein the controller is configured to control said actuator such that the frictional force which depends on detection result of said detector is applied to said belt by said frictional-force applier.

11. The seatbelt device for the vehicle of claim 8, further comprising:
a detector to detect at least one of a vehicle speed when an impact load which is greater than a specified value is inputted to the vehicle and a size of the occupant; and
wherein the controller is configured to control said actuator such that the frictional force which depends on detection result of said detector is applied to said belt by said frictional-force applier.

12. The seatbelt device for the vehicle of claim 1, further comprising:
a detector to detect at least one of a vehicle speed when an impact load which is greater than a specified value is inputted to the vehicle and a size of the occupant; and
wherein the controller is configured to control said actuator such that the frictional force which depends on detection result of said detector is applied to said belt by said frictional-force applier.

13. The seatbelt device for the vehicle of claim 1, wherein the control unit executes (A) an operation of a pretensioner mechanism which eliminates looseness of the belt by making the spool quickly wind up the belt in an emergency, (B) an operation of a lock mechanism which restricts drawing of the belt from the spool in the emergency, and (C) a restraint-load determination control when the vehicle has a collision.

14. The seatbelt device for the vehicle of claim 13, wherein
the control unit determines whether or not adding the restraint load is necessary based on the result of the executed restraint-load determination control,
the control unit controls the restraint-load applying device to not operate when the control unit determines that adding the restraint load is unnecessary, and
the control unit controls the restraint-load applying device so that the restraint load is added by the restraint-load applying device when the control unit determines that adding the restraint load is necessary.

15. The seatbelt device for the vehicle of claim 1,
wherein the control unit calculates the added restraint load based on at least one of a body size of the occupant and a magnitude of the collision speed, and
wherein the added restraint load is calculated so that the added restraint load becomes larger as a detection value of a seat-weight sensor becomes greater and/or the added restraint load becomes larger as a time required for an integrated value of a vehicle deceleration detected by an acceleration sensor to reach a predetermined threshold decreases.

* * * * *